No. 614,547. Patented Nov. 22, 1898.
W. H. HAWORTH.
DEVICE FOR AIR TIGHT PLUGGING OF HOLES.
(Application filed Feb. 28, 1898.)
(No Model.)

Witnesses, Inventor,

UNITED STATES PATENT OFFICE.

WILLIAM H. HAWORTH, OF NEW YORK, N. Y.

DEVICE FOR AIR-TIGHT PLUGGING OF HOLES.

SPECIFICATION forming part of Letters Patent No. 614,547, dated November 22, 1898.

Application filed February 28, 1898. Serial No. 672,046. (No model.)

*To all whom it may concern:*

Be it known that I, WILLIAM HENRY HAWORTH, a citizen of the United States, residing in the city of New York, county of Kings, and State of New York, have invented new and useful Improvements in Devices for the Air-Tight Plugging of Holes in Surfaces Exposed on Only One Side; and I do hereby declare that the following is a full and exact description thereof, reference being had to the accompanying drawings, and to the letters of reference marked thereon, making a part of this specification.

My invention relates to fastenings for securing the heads of bolts in holes through surfaces which are exposed only on one side in such a manner that the bolt-head may be inserted through a hole from the exposed side of a surface, and by then turning a nut, behind which is a washer, the exposed surface and the washer may be brought into an air-tight compact; and it has for its object the air-tight plugging of holes in steam and hot-water boilers and other hollow devices at reduced cost and with increased efficiency.

The invention consists, substantially as is hereinafter described and claimed, in the combination, with a threaded bolt having a head which is semispherical on the side toward the thread, of a short length of soft-metal tubing fitted loosely upon the bolt and designed to partially enter the hole which is to be plugged, of a washer of elastic composition behind another washer of hard metal, and of a nut on the threaded end of the bolt. By means of turning the nut while the bolt is held stationary by gripping the end projecting through the nut the bolt-head is pressed against the short length of soft-metal tube with sufficient force to split open and thereby enlarge the circumference of that portion of the tube that does not enter the hole in which the fastening has been fitted, while that portion of the tube entering said hole is kept intact by the metal through which the hole extends. The bolt-head by this enlargement of the tube being prevented from slipping through the hole, and the nut being further tightened, the washer of elastic composition may be made to press so hard against the exposed surface of the metal through which the hole extends, and also against the thread of the bolt, as to render air-tight the plug which has thus been secured in the hole.

Figure 1:
Figure 2:
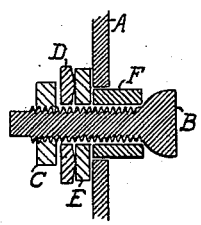
Figure 3:
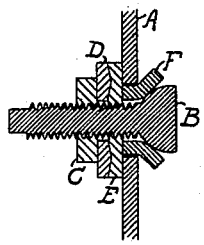
Figure 4:
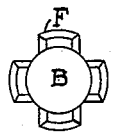

In the accompanying drawings, Figure 1 is an end view of the device, showing the nut and washer and the threaded end of the bolt, which is made square for a short distance to facilitate gripping it when the nut is to be tightened. Fig. 2 is a sectional view showing the device fitted to the hole to be plugged and ready for the nut to be tightened. Fig. 3 is a sectional view showing the nut tightened and the consequent action on the device. Fig. 4 is an end view of the head of the bolt, showing the short length of soft-metal tube split by action of tightening the nut.

A represents the piece of metal through which is a circular hole.

B represents the bolt, threaded at one end and having a semispherical head at the other.

C represents the nut; D, the washer of hard metal; E, the washer of elastic composition, and F the short length of soft-metal tubing.

It is evident that to facilitate the splitting and enlargement of F through the action of tightening the nut the tube may be either reamed, slit, indented, creased, or perforated part of the way from the end adjoining the bolt-head.

The hard-metal washer D is formed on its inner face with a ridge circling around its center midway between the hole through the same and the outer circumference of the washer, and it is evident that the sloping sides of this ridge pressing against the washer E, of elastic composition, will extend it toward its center and circumference, causing it to press closely against the thread of the bolt and against the outer edge of the hole through the metal A when C is screwed tightly against the washer D. It is further evident that if the bolt B is firmly held in the position shown in Fig. 2 by gripping the squared end with a pair of pliers or other device and the nut C is then forcibly turned on the thread in the direction of the bolt-head the consequent gradual lessening of the distance between the nut and the bolt-head will cause the latter to split the tube F to aline where it enters the hole in the metal A, and will also cause its split end to bend outward, as shown in Fig. 3, when it will then be possible to further tighten the nut until an air-tight pressure of the washer E upon the sides of the bolt and the hole in the metal A is effected.

I claim as my invention—

The combination, in a device for the air-tight plugging of holes in surfaces exposed on only one side, of a threaded bolt or screw with a head semispherical on the side toward the thread, a short length of soft-metal tubing adapted to extend through the hole which is to be plugged and arranged so as to split and bend outward from said bolt or screw only to the line of the inside face of said hole, a nut working upon said bolt and the remainder of the tube being prevented from splitting by the wall of said hole, a washer of elastic composition beneath a washer of hard metal adapted thereto by means of a beveled ridge on the inside of the latter, so that through the action of the screw and nut an air-tight pressure may be obtained of the elastic washer on the bolt-thread and the outer edge of a hole through a surface, substantially in the manner and for the purpose herein set forth.

In testimony whereof I affix my signature in presence of two witnesses.

WM. H. HAWORTH.

Witnesses:
MICHAEL WALSH,
FULLER CLAFLIN.